United States Patent
Sun et al.

(10) Patent No.: US 11,217,187 B2
(45) Date of Patent: Jan. 4, 2022

(54) DISPLAY DRIVING METHOD, DISPLAY DRIVING DEVICE AND DISPLAY APPARATUS

(71) Applicant: Xianyang Caihong Optoelectronics Technology Co., Ltd, Xianyang (CN)

(72) Inventors: Lei Sun, Xianyang (CN); Yuyeh Chen, Xianyang (CN); Yin Cai, Xianyang (CN); Panfei Zhang, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 39 days.

(21) Appl. No.: 16/871,225

(22) Filed: May 11, 2020

(65) Prior Publication Data
US 2021/0350756 A1    Nov. 11, 2021

(51) Int. Cl.
*G09G 3/36* (2006.01)
*G06F 1/28* (2006.01)

(52) U.S. Cl.
CPC ............... *G09G 3/36* (2013.01); *G06F 1/28* (2013.01); *G09G 2310/08* (2013.01); *G09G 2330/026* (2013.01)

(58) Field of Classification Search
CPC ............... G09G 3/36; G09G 2310/08; G09G 2330/026; G06F 1/28
See application file for complete search history.

(56) References Cited

U.S. PATENT DOCUMENTS

| | | | |
|---|---|---|---|
| 10,789,196 B2 * | 9/2020 | Tanaka | G06F 13/404 |
| 2021/0065641 A1 * | 3/2021 | He | G09G 3/3655 |

\* cited by examiner

*Primary Examiner* — Kenneth B Lee, Jr.
(74) *Attorney, Agent, or Firm* — WPAT, PC

(57) ABSTRACT

A display driving method, a display driving device and a display apparatus are provided. The method includes: reading a first check code in a first memory and a second check code in a second memory; and selectively performing one of step (a) and step (b): step (a): transmitting a second data code stored in the second memory to the first memory and storing the same in the first memory, and reading a first data code and/or the second data code stored in the first memory, when the first check code is not matched with the second check code; step (b): reading a first data code and/or a second data code stored in the first memory, when the first check code is matched with the second check code. The first memory is arranged on a control circuit board, and the second memory is arranged on a horizontal direction circuit board.

10 Claims, 3 Drawing Sheets

---

Reading a first check code in a first storage and a second check code in a second storage — S1

Transmitting a second data code stored in the second storage to the first storage and storing the second data code In the first storage, and reading a first data code and the second data code stored in the first storage, when the first check code is not matched with the second check code — S2

Or, reading a first data code and a second data code stored in the first storage directly when the first check code is matched with the second check code — S3

DISPLAY DRIVING METHOD, DISPLAY DRIVING DEVICE AND DISPLAY APPARATUS

TECHNICAL FIELD

The disclosure relates to the technical field of display panels, and in particular to a display driving method, a display driving device and a display apparatus.

BACKGROUND

A liquid crystal display (LCD) has advantages of light weight and low power consumption and is generally recognized by the market and consumers. A circuit system of the existing LCD generally consists of three parts: a power supply, a system on chip (SOC) and a liquid crystal driver In order to drive a display apparatus and realize correct image display, the display apparatus is provided with a driver, which is provided with a memory and a timing controller (TCON). The memory stores data code information of the TCON, and the TCON reads the data code information stored in the memory and drives the display apparatus according to the data code information.

Generally, a control circuit board and the horizontal direction circuit board of the liquid crystal display are manufactured and sold separately. Reference is made to FIG. 1, which is a schematic structural diagram of a driving device for a display panel in a related art. A flash memory (flash1) on a control board (CB) stores initialization parameters of a control chip such as a timing controller (TCON), a display look-up table (LUT) of digital gamma and over driving, and a dither code. Since display panels are not exactly the same, optical compensation data generated by a de-mura technology is stored in another flash memory (flash2) of a horizontal direction circuit board (XB, X-board for short). Upon powering-on, the TCON acquires the data stored in flash memories (flash1 and flash2) through connection interfaces.

As shown in FIG. 1, the flash1 is close to the TCON, and the TCON is able to download data from the flash1 quickly. However, the flash2 is arranged on the horizontal direction circuit board XB, which is far away from the TCON. A signal will be attenuated after long-distance transmission, and thus a probability of data transmission error increases and a speed of the TCON downloading data from the flash2 is low, which makes time for initialing and driving the TCON is too long, and thus results in too long start-up time of the panel.

SUMMARY

In order to solve the above problems in the prior art, the disclosure provides a display driving method, a display driving device and a display apparatus. A technical problem to be solved is addressed through the following technical solutions.

In one aspect, the disclosure provides a display driving method, comprising: reading a first check code in a first memory and a second check code in a second memory; and selectively performing one of following step (a) and step (b): step (a), transmitting a second data code stored in the second memory to the first memory and storing the second data code in the first memory and reading a first data code and/or the second data code stored in the first memory, when the first check code is not matched with the second check code; step (b), reading a first data code and/or a second data code stored in the first memory, when the first check code is matched with the second check code. The first memory is arranged on a control circuit board, and the second memory is arranged on a horizontal direction circuit board.

In an embodiment of the disclosure, before reading a first check code in a first memory and a second check code in a second memory, the display driving method further comprises: detecting a power-on signal by a timing controller.

In an embodiment of the disclosure, reading a first check code in a first memory and a second check code from a second memory comprises: reading the first check code in the first memory and the second check code in the second memory, by the timing controller through serial peripheral interfaces.

In an embodiment of the disclosure, the first memory comprises a first memory area and a second memory area, the first memory area is configured to store the first data code and the first check code. The transmitting a second data code stored in the second memory to the first memory and storing the second data code in the first memory comprises: transmitting the second data code stored in the second memory to the second memory area of the first memory through a serial peripheral interface.

In an embodiment of the disclosure, reading a first data code and/or the second data code stored in the first memory in the step (a) comprises: transmitting position information to a control area of the first memory, by a timing controller; positioning a corresponding memory position according to the position information; and receiving the first data code and/or the second data code stored in the first memory corresponding to the memory position, by the timing controller.

In another aspect, the disclosure provides a display driving device, comprising: a control circuit board and a horizontal direction circuit board. The control circuit board is provided with a timing controller and a first memory, the horizontal direction circuit board is provided with a second memory, the first memory stores a first check code and a first data code, and the second memory stores a second check code and a second data code. The timing controller is electrically connected with the first memory and the second memory, and configured to: read the first check code and the second check code and compare the first check code and the second check code; transmit the second data code to the first memory, and read the first data code and/or the second data code stored in the first memory, in a situation of the first check code being not matched with the second check code; or, read the first data code and/or the second data code stored in the first memory, in a situation of the first check code being matched with the second check code.

In an embodiment of the disclosure, the timing controller is connected with a power supply and configured to detect a power-on signal.

In an embodiment of the disclosure, the first memory comprises a first memory area and a second memory area, the first memory area is configured to store the first data code and the first check code; and the second memory area is configured to receive and store the second data code and the second check code from the second memory.

In an embodiment of the disclosure, the timing controller, the first memory and the second memory are electrically connected with one another through serial peripheral interfaces.

In a further aspect, the disclosure provides a display apparatus, comprising: a display panel; and the display driving device according to any one of the above embodiments. The display driving device is electrically connected with the display panel.

Compared with the prior art, the disclosure has the following beneficial effects that: according to the display driving method of the disclosure, when the display driving device is powered on for the first time, all data code in the second memory located on the horizontal direction circuit board is transmitted to the first memory located on the control circuit board, such that: when the display driving device is powered later, all data codes stored in the first memory is merely required to be downloaded, thereby improving a driving speed and reducing start-up time of the whole machine.

The above description is only an overview of the technical solutions of the disclosure. In order to better understand the technical means of the disclosure to implement the disclosure according to contents of the specification and in order to make the above objects and other objects, features and advantages of the disclosure more clear and understandable, a detailed description of preferred embodiments is explained hereinafter with reference to accompanying drawings.

Figure 1:
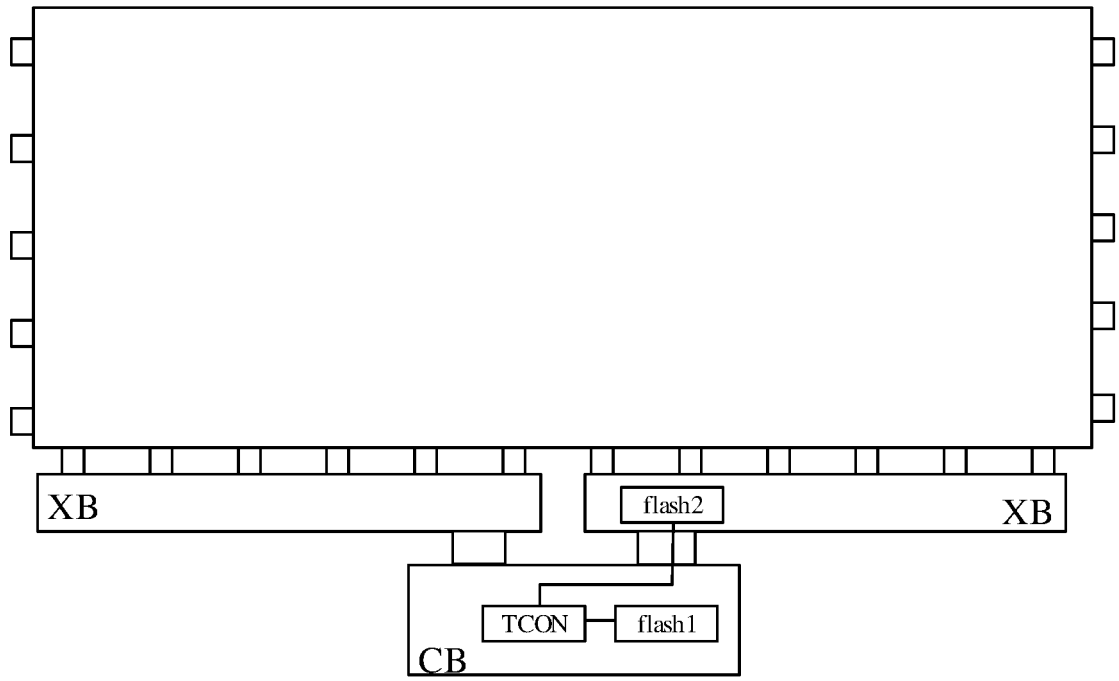
FIG. 1 is a schematic structural diagram of a display apparatus in a related art.

Reference numerals are as follows: 1—control circuit board; 2—horizontal direction circuit board; 3—timing controller; 4—first memory; 5—second memory; 6—display panel; 7—connector; 8—chip-on-film (COF).

DETAILED DESCRIPTION OF EMBODIMENTS

In order to further illustrate technical means and effects adopted by the disclosure to achieve the intended purpose of the disclosure, the display driving method, the display driving device and the display apparatus proposed in accordance with the disclosure will be described in detail hereinafter with reference to the accompanying drawings and specific embodiments.

The foregoing and other technical contents, features and effects of the disclosure will become apparent in the following detailed description of the specific embodiments with reference to the accompanying drawings. Through the description of the specific embodiments, the technical means and effects adopted by the disclosure to achieve the intended purpose can be understood more deeply and specifically. However, the accompanying drawings are for reference and explanation only and are not intended to limit the technical solutions of the disclosure.

It should be noted that in this document, relational terms such as first and second, etc. are only used to distinguish an entity or operation from another entity or operation, and do not necessarily require or imply any such actual relationship or order between these entities or operations. Moreover, the terms "including", "comprising" or any other variation thereof are intended to cover a non-exclusive inclusion, such that an article or device that includes a series of elements includes not only those series of elements but also other elements not expressly listed. Without further restrictions, the element defined by a statement 'comprise a . . . ' does not excludes a presence of another identical element in the article or device that includes the element.

First Embodiment

Figure 2:
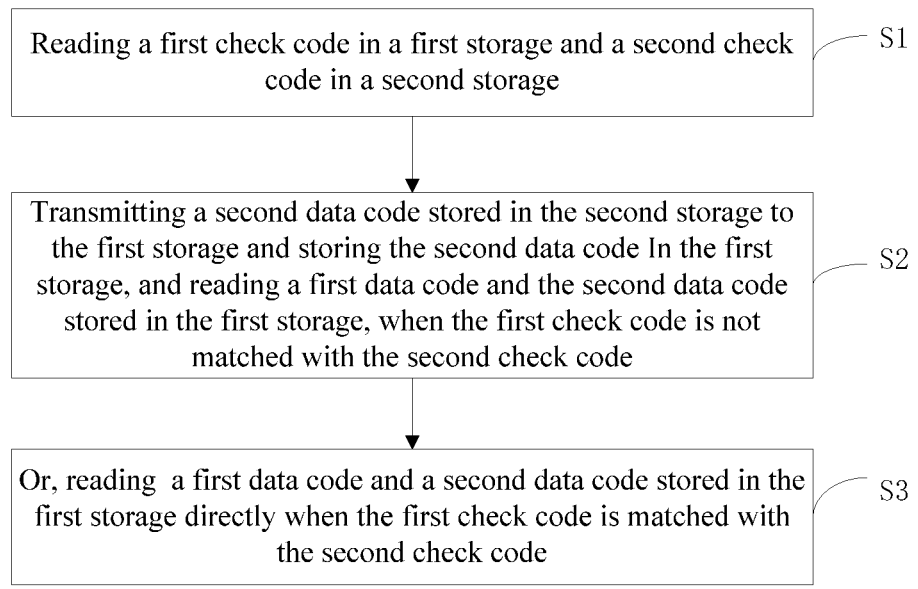
FIG. 2 is a flowchart of a display driving method according to an embodiment of the disclosure.

Reference is made to FIG. 2, which illustrates a flowchart of a display driving method according to an embodiment of the disclosure. The display driving method exemplarily includes the following steps.

Step S1, a first check code in a first memory and a second check code in a second memory are read.

In the embodiment, the first memory and the second memory are individually connected with a timing controller, and the timing controller is configured (i.e., structured and arranged) to read data parameters stored in the first memory and data parameters stored in the second memory.

Step S2, a second data code stored in the second memory is transmitted to the first memory and then stored in the first memory, and a first data code and/or the second data code stored in the first memory is/are read, when the first check code is not matched with the second check code.

Step S3, or, a first data code and/or a second data code stored in the first memory is/are read, when the first check code is matched with the second check code.

The first memory is arranged on a control circuit board, and the second memory is arranged on a horizontal direction circuit board.

In an embodiment, the first check code and the second check code are both preset, each of which is a sum of a group of data items, and is used for verification purposes. The second check code may be set to be the same as the first check code, and in a process of determining whether the first check code is matched with the second check code, it is only required to determine whether the first check code is the same as the second check code. Of course, the first check code and the second check code may also be different, in this case, a matching rule is preset for the first check code and the second check code, it is only required to determine whether the first check code and the second check code meet the preset matching rule. The data code is an operation data of a control chip and mainly includes initialization parameters of the control chip and a display look-up table (LUT) of functional modules of the control chip. The functional modules at least a digital gamma module and an over driving module.

A visual system of a human being has a logarithmic relation with respect to a brightness or perception of the display, instead of a linear relation. A gamma correction process needs to be introduced in the display to ensure that the image presented by the display is the same as an original image inputted into the display. A gray scale curve of the display is adjusted through a gamma correction process of digital gamma to achieve the best visual effect. The gamma correction process is realized by using a brightness lookup table. An address of a brightness is stored in the lookup table, and a gray scale of the image is adjusted according to the lookup table to eliminate uneven brightness of the image and improve the quality of the image. Through the display lookup table of a voltage drive technology, the driven gray scale can be obtained according to gray scales corresponding to the input current frame image and the previous frame image, and the driven gray scale is output to a display panel to display the image. Further, a brightness display uniformity and a display area of each display panel are different, so the each display panel is provided with applicable optical compensation data, and when the image is displayed, the control chip reads the optical compensation data to effectively overcome the defect of uneven brightness of the display panel and improve the quality of the image.

Figure 4:
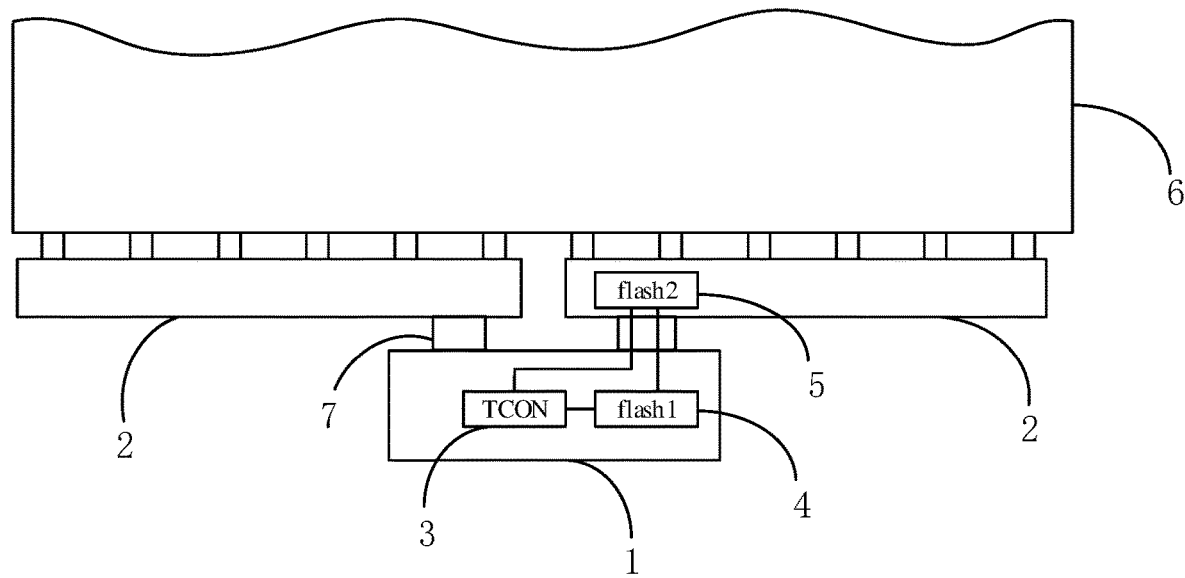
FIG. 4 is a schematic structural diagram of a display driving device according to an embodiment of the disclosure.

In order to further understand the display driving method of the embodiment, reference is made to FIG. 4, which is a schematic structural diagram of a display driving device according to an embodiment of the disclosure. As shown in FIG. 4, the display driving device for executing the display driving method of the embodiment includes a control circuit board 1 and a horizontal direction circuit board 2. The control circuit board 1 is provided with a control chip such as a timing controller 3 and a first memory 4, and the horizontal direction circuit board is provided with a second memory 5; and the timing controller 3, the first memory 4 and the second memory 5 are electrically connected with one another.

Typically, the control circuit board 1 and the horizontal direction circuit board 2 of a liquid crystal display are manufactured and sold separately. Since an integrated circuit of the control chip does not have enough storage function, data such as configuration parameters required for the operation of the control chip is stored in specific memory integrated circuits, such as the first memory and the second memory of the embodiment.

In an illustrated embodiment, the first memory 4 on the control circuit board 1 stores initialization parameters of the timing controller 3, a display look-up tables (LUT) of the digital gamma module and the over driving module, a dither code, and the like, and the second memory 5 stores operation data for the control chip to operate and optical compensation data matched with the display panel. That is, the first data code in the embodiment may include the initialization parameters of the timing controller 3, the display look-up tables of the digital gamma module and the over driving module, and the dither code, etc. The second data code in the embodiment may include the operation data for the control chip to operate and the optical compensation data matched with the display panel.

In an exemplary embodiment, each of the first memory 4 and the second memory 5 is a flash memory. The flash memory is a form of an electronic erasable programmable read-only memory that allows multiple erases or writes during operation.

For such a storage manner, a driving method is that the timing controller acquires data stored in the first memory and data stored in the second memory respectively through connection interfaces. As shown in FIG. 4, the timing controller 3 and the first memory 4 are arranged on the control circuit board 1, and the second memory 5 is arranged on the horizontal circuit board 2, therefore, the first memory 4 is closer to the timing controller 3, the timing controller 3 can acquire data in the first memory 4 quickly, but the second memory 5 is further away from the timing controller 3, and a signal will be attenuated after long-distance transmission, and thus a probability of data transmission error increases and a speed of the TCON downloading data from the second memory 5 is low, which makes time for initialing and driving the timing controller 3 is too long, and thus results in too long start-up time of the display apparatus.

Figure 3:
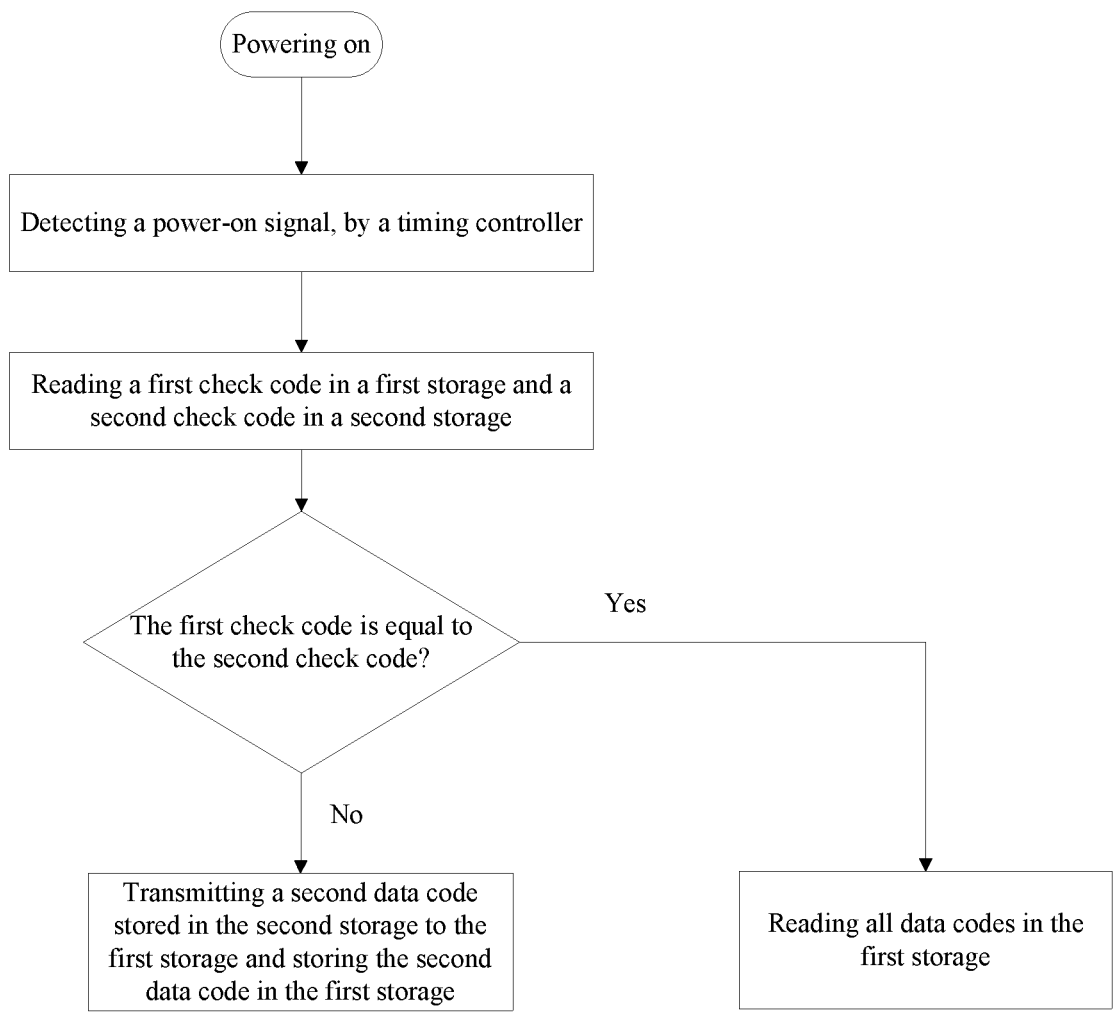
FIG. 3 is a specific flowchart of a display driving method according to an embodiment of the disclosure.

Reference is made to FIG. 3, which is a specific flowchart of a display driving method according to an embodiment of the disclosure. In the display driving method of the embodiment, a power is first supplied to the display driving device, and the timing controller detects a power-on signal.

When the timing controller detects the power-on signal, the first check code located in the first memory and the second check code located in the second memory are sequentially obtained.

In an exemplary embodiment, the timing controller reads the first check code in the first memory and the second check code in the second memory through serial peripheral interfaces (SPIs).

The serial external interface (SPI) has the advantages of supporting duplex operation, simple operation, high data transmission rate, etc., therefore, the serial external interface is used as an interface adopted in the embodiment, when the timing controller reads the data stored in the memory through the interface.

After reading the first check code and the second check code, the timing controller determines whether the first check code and the second check code are matched with each other, e.g., are the same. If the display driving device is powered on for the first time, the first check code and the second check code are usually determined to be different, in this case, the timing controller transmits a transmission instruction, such that a second data code stored in the second memory is transmitted to the first memory and stored in the first memory.

It should be noted that in the illustrated embodiment, a storage capacity of the first memory is larger than a capacity of the second memory, and the first memory includes a first memory area and a second memory area, where the first memory area is configured to store the first data code and the first check code. The second memory area is empty before a first power-on operation, and is configured to store a second data code and a second check code from the second memory after the first power-on operation.

Specifically, transmitting a second data code stored in the second memory to the first memory and storing the second data code in the first memory includes: transmitting the second data code and the second check code stored in the second memory to the second memory area of the first memory through a serial peripheral interface (SPI) and storing the second data code and the second check code in the second memory area.

Then, the timing controller reads data codes stored in the first memory.

Since the second data code in the second memory have been copied and stored in the first memory, the timing controller can finish reading all parameters by directly reading the all data codes in the first memory.

Then, at a second power-up operation, similarly, the timing controller determines whether the first check code and the second check code are the same after reading the first check code and the second check code. Since all the data including the second check code stored in the second memory has been stored in the first memory during the first power-up operation, it is found that the same check code exists in the first memory and the second memory during the comparison of the first check code and the second check code, then the timing controller directly reads all the data codes stored in the first memory without reading the data code in the second memory, and the data codes in the first memory is only required to be read during the subsequent power-up operation. Since the first memory is closer to the timing controller, the downloading process is faster, and the initialization time of the driving device can be improved.

According to the display driving method of the disclosure, when the display driving device is powered on for the first time, the data code in the second memory located on the horizontal direction circuit board are transmitted to the first memory located on the control circuit board, and the data codes in the first memory is only required to be downloaded during a subsequent power-on operation, so that the driving speed can be improved, and start-up time of the display driving device can be reduced.

Second Embodiment

Based on the above embodiment, the embodiment provides another display driving method. It should be noted that the structure of the display driving device that executes the display driving method of the embodiment is the same as that of the above embodiment, and will not be repeated here.

The display driving method of the embodiment includes steps 1 to 7.

Step 1, the display driving device is powered on for the first time, and the timing controller reads the check code located in the first memory and the check code located in the second memory.

Step 2, the check code in the first memory is compared with the check code in the second memory, and the comparison result is that the check code in the first memory is different from the check code in the second memory.

Step 3, a data code and the check code stored in the second memory are transmitted and stored in the first memory.

Step 4, the timing controller acquires all data codes in the first memory; and the all data codes include an original data code stored in the first memory and the data code from the second memory.

Step 5, when the display driving device is powered on again, the timing controller reads the check code located in the first memory and the check code located in the second memory.

Step 6, the check code in the first memory is compared with the check code in the second memory, and the comparison result is that the check code in the first memory is the same as the check code in the second memory.

Step 7, The timing controller acquires all data codes in the first memory.

Specifically, the step 7 includes steps 71 to 73.

Step 71, the timing controller transmits position information to a control area of the first memory.

Step 72, a corresponding memory location is positioned according to the location information.

Step 73, the timing controller receives all data codes corresponding to the memory locations.

In the embodiment, the timing controller reads all data codes in the first memory through a serial peripheral interface (SPI). The all data codes include the original data codes in the first memory and the data codes from the second memory.

It should be noted that in a subsequent power-up process after the first power-up, the check code in the first memory is the same as the check code in the second memory, so the timing controller directly reads all data codes stored in the first memory without reading the data code in the second memory. Since the first memory is closer to the timing controller and the downloading process is faster, the initialization time of the driving device can be improved.

Third Embodiment

Based on the above method embodiment, the embodiment provides a display driving device. Reference is made to FIG. 4, which is a schematic structural diagram of a display driving device according to an embodiment of the disclosure. The display driving device of the embodiment includes a control circuit board 1 and a horizontal direction circuit board 2. The control circuit board 1 is provided with a timing controller 3 and a first memory 4, and the horizontal circuit board 2 is provided with a second memory 5. Further, the timing controller 3, the first memory 4 and the second memory 5 are electrically connected to one another through serial peripheral interfaces. The first memory 4 stores a first check code and a first data code, and the second memory 5 stores a second check code and a second data code. The timing controller 3 is configured to read the first check code and the second check code and comparing the first check code with the second check code, transmit the second data code to the first memory 4 in a situation of the first check code being not matched with the second check code, and then read the first data code and/or the second data code stored in the first memory 4; or read a first data code and/or a second data code stored in the first memory 4 directly in a situation that the first check code being matched with the second check code.

Typically, the control circuit board 1 and the horizontal direction circuit board 2 of a liquid crystal display screen are manufactured and sold separately. Since an integrated circuit of the control chip does not have a memory function, data such as configuration parameters required for the operation of the control chip are stored in specific memory integrated circuits, such as the first memory and the second memory in the embodiment.

In the embodiment, the first memory 4 on the control circuit board 1 stores initialization parameters of the timing controller 3, a display look-up table (LUT) of the digital gamma module and the over driving module, a dither code, and the like, and the second memory 5 stores operation data for the control chip to operate and optical compensation data matched with the display panel. In addition, the timing controller 3 is connected to a power supply (not shown) and for detecting a power-on signal.

During the use of the display driving device, the timing controller 3 determines whether the first check code and the second check code are the same after reading the first check code and the second check code. If the display driving device is powered on for the first time, the first check code and the second check code are usually determined to be different. In this case, the timing controller 3 transmits a transmission instruction to transmit the second data code and the second check code stored in the second memory 5 to the first memory 4 and stored in the first memory 4.

It should be noted that in the illustrated embodiment, a memory capacity of the first memory 4 is larger than a memory capacity of the second memory 5. The first memory 4 includes a first memory area and a second memory area, and the first memory area is configured to store the first data code and the first check code. The second memory area is empty before the first power-up, and is configured to store the second data code and the second check code from the second memory 5 after the first power-up.

Specifically, the timing controller 3 transmits a control instruction according to the comparison result to control the transmission of the second data code and the second check code to the second memory area of the first memory through a serial peripheral interface (SPI) and store the second data code and the second check code in the first memory. The serial external interface (SPI) has the advantages of supporting duplex operation, simple operation, high data transmission rate, etc., therefore, the serial external interface is used as an interface adopted in the embodiment, when the timing controller reads the data stored in the memory through the interface.

Then, the timing controller 3 reads all data codes stored in the first memory 4.

In this case, since the second data code stored in the second memory have been copied and stored in the first memory, the timing controller can finish reading all the parameters by directly reading the data codes in the first memory.

Then, at the second power-up, similarly, the timing controller 3 determines whether the first check code and the second check code are the same after reading the first check code and the second check code. Since all the data including the second check code stored in the second memory 5 has been stored in the first memory 4 during the first power-up operation, it is found that the same check code exists in the first memory and the second memory during the comparison of the first check code and the second check code, then the timing controller 3 directly reads all the data codes stored in the first memory without reading the data code in the second memory, and only the data codes in the first memory is only required to be read during the subsequent power-up operation. Since the first memory is closer to the timing controller, the downloading process is faster, and the initialization time of the driving device can be improved.

Further, as shown in FIG. 4, the display driving device of the embodiment includes two horizontal direction circuit boards 2, which are distributed in parallel on a side of the display panel 6 and are connected to the control circuit board 1 through a connector 7 respectively.

Figure 5:
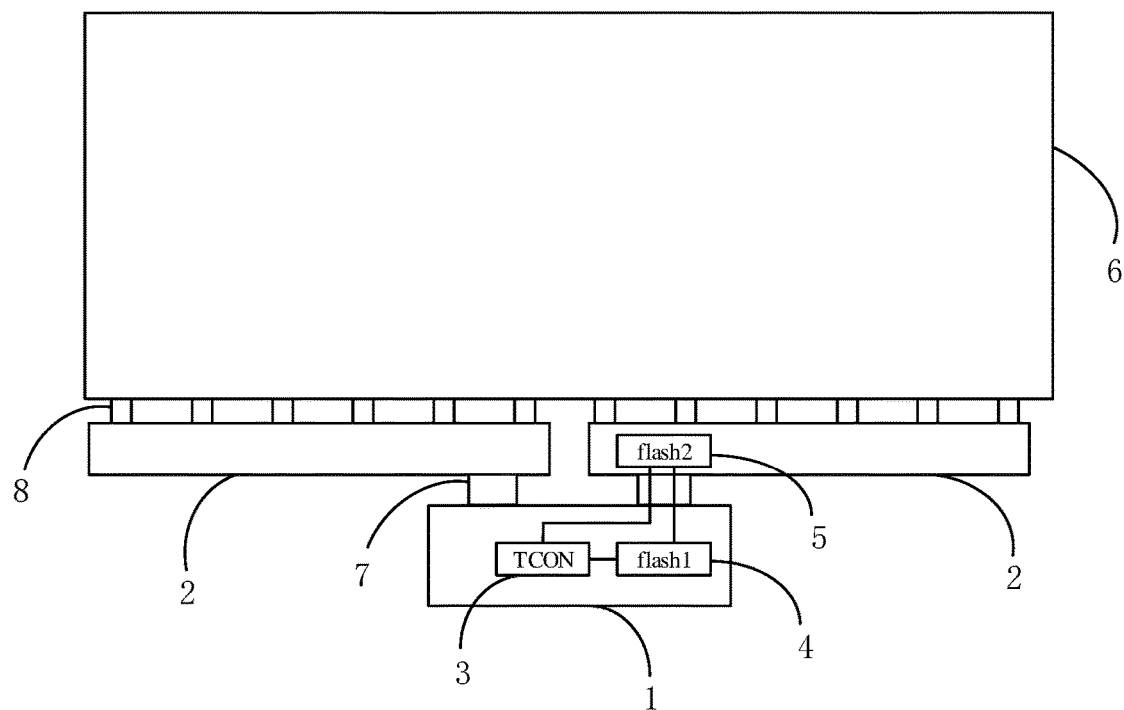
FIG. 5 is a schematic structural diagram of a display apparatus according to an embodiment of the disclosure.

In addition, another embodiment of the disclosure provides a display apparatus, reference is made to FIG. 5, which is a schematic structural diagram of a display apparatus according to an embodiment of the disclosure. The display apparatus includes a display panel 6 and the display driving device according to any one of the above embodiments. The display panel is electrically connected with the display driving device.

Specifically, the display driving device is connected to the display panel 6 through multiple chip-on-films (COFs) 8 uniformly arranged on a side of the display panel 6, and multiple connection traces are arranged each chip-on-film 8 to transmit various data signals from the horizontal direction circuit board 2 of the display driving device to the display panel 6 to drive a display of the display panel 6 and control a display effect thereof. In other words, as shown in FIG. 5, the horizontal direction circuit board 2 is electrically connected with the control circuit board 1 and adapted for being electrically connected to the display panel 6 by the COFs 8.

The display apparatus can specifically be any product or component with a display function such as a liquid crystal display apparatus, electronic paper, a mobile phone, a tablet computer, a television, a notebook computer, a digital photo frame, a navigator and the like.

When the display driving device of the disclosure is powered on for the first time, the data code in the second memory located on the horizontal direction circuit board is transmitted to the first memory located on the control circuit board, and it is only required to download all data codes stored in the first memory when the display apparatus is powered on subsequently, so that the driving speed can be improved, and the start-up time of the display apparatus can be reduced.

The above is a further detailed description of the disclosure in connection with specific preferred embodiments, and it cannot be assumed that the specific embodiments of the disclosure are limited to these descriptions. For a person of ordinary skill in the technical field to which the disclosure belongs, several simple deduction or substitution can be made without departing from the concept of the disclosure, which should be regarded as belonging to the scope of the disclosure.

What is claimed is:

1. A display driving method, comprising:
   reading a first check code in a first memory and a second check code in a second memory; and
   selectively performing one of following step (a) and step (b):
      step (a): transmitting a second data code stored in the second memory to the first memory and storing the second data code in the first memory, and reading a first data code and/or the second data code stored in the first memory, when the first check code is not matched with the second check code;
      step (b): reading a first data code and/or a second data code stored in the first memory, when the first check code is matched with the second check code;
   wherein the first memory is arranged on a control circuit board, and the second memory is arranged on a horizontal direction circuit board;
   wherein the first memory comprises a first memory area and a second memory area, the first memory area is configured to store the first data code and the first check code;
   wherein transmitting a second data code stored in the second memory to the first memory and storing the second data code in the first memory comprises:
      transmitting the second data code stored in the second memory to the second memory area of the first memory through a serial peripheral interface.

2. The display driving method according to claim 1, wherein before reading a first check code in a first memory and a second check code in a second memory, the display driving method further comprises:
   detecting a power-on signal by a timing controller;
   wherein the timing controller is arranged on the control circuit board, and the horizontal direction circuit board is electrically connected with the control circuit board and adapted for being electrically connected to a display panel by chip-on-films.

3. The display driving method according to claim 2, wherein reading a first check code in a first memory and a second check code in a second memory comprises:
   reading the first check code in the first memory and the second check code in the second memory, by the timing controller through serial peripheral interfaces.

4. The display driving method according to claim 1, wherein reading a first data code and/or the second data code stored in the first memory in the step (a) comprises:
   transmitting position information to a control area of the first memory, by a timing controller;
   positioning a corresponding memory position according to the position information;
   receiving the first data code and/or the second data code stored in the first memory corresponding to the memory position, by the timing controller.

5. A display driving device, comprising: a control circuit board (1) and a horizontal direction circuit board (2); wherein
   the control circuit board (1) is provided with a timing controller (3) and a first memory (4), the horizontal direction circuit board (2) is provided with a second memory (5), the first memory (4) stores a first check code and a first data code, and the second memory (5) stores a second check code and a second data code;

the timing controller (3) is electrically connected with the first memory (4) and the second memory (5), and configured to:

read the first check code and the second check code and compare the first check code and the second check code;

transmit the second data code to the first memory (4), and read the first data code and/or the second data code stored in the first memory (4), in a situation of the first check code being not matched with the second check code; or, read the first data code and/or the second data code stored in the first memory (4), in a situation of the first check code being matched with the second check code;

wherein the first memory (4) comprises a first memory area and a second memory area, the first memory area is configured to store the first data code and the first check code, and the second memory area is configured to receive and store the second data code and the second check code from the second memory (5).

6. The display driving device according to claim 5, wherein the timing controller (3) is connected with a power supply and configured to detect a power-on signal.

7. The display driving device according to claim 5, wherein the timing controller (3), the first memory (4) and the second memory (5) are electrically connected with one another through serial peripheral interfaces.

8. A display apparatus, comprising:

a display panel (6); and the display driving device according to claim 5, wherein the display driving device is electrically connected with the display panel (6);

wherein the first memory (4) comprises a first memory area and a second memory area, the first memory area is configured to store the first data code and the first check code, and the second memory area is configured to receive and store the second data code and the second check code from the second memory (5).

9. The display apparatus according to claim 8, wherein the timing controller (3) is connected with a power supply and configured to detect a power-on signal.

10. The display apparatus according to claim 8, wherein the timing controller (3), the first memory (4) and the second memory (5) are electrically connected with one another through serial peripheral interfaces.

* * * * *